(12) United States Patent
Willoughby et al.

(10) Patent No.: US 9,113,657 B2
(45) Date of Patent: *Aug. 25, 2015

(54) APPARATUS AND METHOD FOR CURLED EXTRUDATE

(75) Inventors: Chris Willoughby, Battle Creek, MI (US); Charles A. Smith, Marshall, MI (US); Norbert Gimmler, Portage, MI (US)

(73) Assignee: Kellogg Company, Battle Creek, MI (US)

( * ) Notice: Subject to any disclaimer, the term of this patent is extended or adjusted under 35 U.S.C. 154(b) by 616 days.

This patent is subject to a terminal disclaimer.

(21) Appl. No.: 12/978,705

(22) Filed: Dec. 27, 2010

(65) Prior Publication Data

US 2011/0091594 A1      Apr. 21, 2011

Related U.S. Application Data

(62) Division of application No. 11/834,362, filed on Aug. 6, 2007, now Pat. No. 7,883,735.

(60) Provisional application No. 60/821,628, filed on Aug. 7, 2006.

(51) Int. Cl.
  *A23P 1/12*       (2006.01)
  *A21C 11/16*      (2006.01)
  (Continued)

(52) U.S. Cl.
  CPC . *A23P 1/12* (2013.01); *A21C 11/16* (2013.01); *A23P 1/125* (2013.01); *A21C 11/10* (2013.01); *B29C 47/0035* (2013.01)

(58) Field of Classification Search
  CPC .... B29C 47/0035; A21C 11/16; A21C 11/10; A21C 11/103; A23P 1/12
  USPC ............... 425/465, 466, 301, 309, 310, 313, 425/382.3, 382.4, 380, 382 R, 382 N, 319, 425/292, 307, 467
  See application file for complete search history.

(56) References Cited

U.S. PATENT DOCUMENTS

| 855,379 | A | | 5/1907 | Bangs | |
| 1,461,504 | A | * | 7/1923 | Guido Tanzi | ................ 425/319 |

(Continued)

FOREIGN PATENT DOCUMENTS

| DE | 1502668 | 8/1969 |
| DE | 2050856 | 4/1972 |

(Continued)

*Primary Examiner* — Seyed Masoud Malekzadeh
(74) *Attorney, Agent, or Firm* — Honigman Miller Schwartz & Cohn LLP; Kathryn D. Doyle, Esq.; Jonathan P. O'Brien

(57) ABSTRACT

An apparatus and method for producing a substantially spiral shaped food product is disclosed herein. The apparatus includes a die defining a plurality of apertures disposed in a circle about a center. The apparatus also includes at least one cutting blade disposed for rotation about the center and operable to intermittently pass fully across each of the apertures during rotation. The apparatus also includes a plurality of slicing blades arranged for individual rotation about one of the plurality of apertures. The plurality of slicing blades are also arranged for continuous extension less than fully across the one aperture. The apparatus also includes a planetary coupling arrangement operably disposed to facilitate reciprocating rotation between the at least one cutting blade and the plurality of slicing blades.

16 Claims, 3 Drawing Sheets

(51) Int. Cl.
*A21C 11/10* (2006.01)
*B29C 47/00* (2006.01)

(56) References Cited

U.S. PATENT DOCUMENTS

| | | | |
|---|---|---|---|
| 1,720,097 A | 7/1929 | Scholz | |
| 1,724,563 A | 8/1929 | Cooper | |
| 1,747,954 A | 2/1930 | Rydberg | |
| 1,765,872 A | 6/1930 | Laskey | |
| 1,804,296 A * | 5/1931 | Winkler | 426/502 |
| 1,817,383 A | 8/1931 | Laskey | |
| 1,934,391 A * | 11/1933 | Vierow | 425/377 |
| 1,938,773 A | 12/1933 | Ernst at al. | |
| 2,113,717 A | 4/1938 | Brown | |
| 2,149,066 A * | 2/1939 | Orsini | 264/75 |
| 2,303,888 A | 12/1942 | Miller | |
| 2,361,369 A | 10/1944 | Grebe et al. | |
| 2,379,347 A | 6/1945 | Fiedler | |
| 2,401,236 A | 5/1946 | Fielitz | |
| 2,402,462 A | 6/1946 | Sullivan | |
| 2,437,460 A | 3/1948 | Francisci | |
| 2,488,129 A | 11/1949 | Lande, Jr. | |
| 2,597,975 A | 5/1952 | Colombo | |
| 2,677,335 A * | 5/1954 | Maldari | 425/464 |
| 2,738,549 A * | 3/1956 | Pazitney, Jr. et al. | 425/191 |
| 2,744,287 A | 5/1956 | Parshall et al. | |
| 2,764,952 A | 10/1956 | Meakin | |
| 2,793,598 A | 5/1957 | Rivoche | |
| 2,853,027 A | 9/1958 | Graves | |
| 2,915,957 A * | 12/1959 | Bowman | 99/323.4 |
| 2,963,995 A | 12/1960 | Brudi | |
| 3,025,564 A | 3/1962 | Voigt | |
| 3,086,246 A | 4/1963 | Stone | |
| 3,089,194 A | 5/1963 | Goins | |
| 3,104,975 A * | 9/1963 | Esteva et al. | 426/448 |
| 3,117,006 A | 1/1964 | Wenger | |
| 3,143,766 A | 8/1964 | Rohn | |
| 3,171,160 A | 3/1965 | Moyer | |
| 3,214,796 A | 11/1965 | Ginaven | |
| 3,225,717 A | 12/1965 | Page | |
| 3,226,527 A | 12/1965 | Harding | |
| 3,256,563 A * | 6/1966 | Criss et al. | 425/466 |
| 3,329,101 A | 7/1967 | Urschel | |
| 3,333,298 A | 8/1967 | List et al. | |
| 3,337,913 A | 8/1967 | List | |
| 3,341,892 A | 9/1967 | Mayner | |
| 3,349,333 A | 10/1967 | Becker et al. | |
| 3,351,026 A * | 11/1967 | Hayashi | 425/306 |
| 3,387,069 A | 6/1968 | Stohr | |
| 3,467,987 A | 9/1969 | Foster | |
| 3,476,567 A | 11/1969 | Wood, Jr. et al. | |
| 3,582,466 A | 6/1971 | Quirk | |
| 3,587,281 A | 6/1971 | Lemelson | |
| 3,596,319 A | 8/1971 | McKenica | |
| 3,605,649 A | 9/1971 | Bundus | |
| 3,624,830 A | 11/1971 | Stehower | |
| 3,646,894 A | 3/1972 | Hasten et al. | |
| 3,708,253 A | 1/1973 | Lemelson | |
| 3,711,296 A | 1/1973 | LaWarre, St. | |
| 3,767,338 A * | 10/1973 | Soderlund et al. | 425/131.1 |
| 3,777,600 A | 12/1973 | Long et al. | |
| 3,782,876 A | 1/1974 | Groff | |
| 3,784,533 A | 1/1974 | Mach | |
| 3,796,532 A | 3/1974 | Needleman | |
| 3,808,962 A | 5/1974 | Liepa | |
| 3,817,141 A | 6/1974 | Simonetti | |
| 3,823,301 A | 7/1974 | Swarat | |
| 3,828,638 A | 8/1974 | Bonney, Jr. | |
| 3,861,844 A * | 1/1975 | Miller | 425/207 |
| 3,867,081 A | 2/1975 | Everett | |
| 3,867,082 A | 2/1975 | Lambertus | |
| 3,876,743 A * | 4/1975 | Soderlund et al. | 264/75 |
| 3,886,832 A | 6/1975 | Harris | |
| 3,912,434 A | 10/1975 | Nagahara et al. | |
| 3,915,615 A | 10/1975 | Colgan | |
| 3,944,641 A | 3/1976 | Lemelson | |
| 3,976,799 A | 8/1976 | Kelly, Jr. et al. | |
| 3,998,919 A | 12/1976 | Urquhart | |
| 4,022,918 A | 5/1977 | Miller | |
| 4,025,260 A * | 5/1977 | Neel | 425/131.1 |
| 4,090,829 A * | 5/1978 | Fischer et al. | 425/73 |
| 4,097,212 A | 6/1978 | Morishima et al. | |
| 4,128,372 A * | 12/1978 | Rose et al. | 425/311 |
| 4,150,595 A | 4/1979 | Loffler et al. | |
| 4,152,102 A | 5/1979 | Sasiela et al. | |
| 4,179,255 A | 12/1979 | Hale | |
| 4,227,306 A | 10/1980 | Meshulam | |
| 4,240,779 A | 12/1980 | Turk | |
| 4,250,786 A | 2/1981 | Bleich | |
| 4,251,198 A | 2/1981 | Altenburg | |
| 4,254,607 A | 3/1981 | Moore | |
| 4,261,940 A | 4/1981 | Bussey, Jr. | |
| 4,262,476 A | 4/1981 | Benenati | |
| 4,300,877 A | 11/1981 | Andersen | |
| 4,305,704 A | 12/1981 | Lemelson | |
| 4,327,050 A | 4/1982 | Salmon | |
| 4,332,538 A | 6/1982 | Campbell | |
| 4,336,010 A | 6/1982 | Thompson | |
| 4,368,610 A | 1/1983 | Aono | |
| 4,395,427 A | 7/1983 | Fischer et al. | |
| 4,401,421 A | 8/1983 | Anders | |
| 4,418,086 A | 11/1983 | Marino et al. | |
| 4,422,372 A | 12/1983 | Hoezee | |
| 4,423,078 A | 12/1983 | Darley et al. | |
| 4,440,704 A | 4/1984 | Bussey, Jr. | |
| 4,445,835 A * | 5/1984 | Wasserbach | 425/131.1 |
| 4,445,838 A * | 5/1984 | Groff | 425/319 |
| 4,462,470 A | 7/1984 | Alexander et al. | |
| 4,478,565 A | 10/1984 | Thompson | |
| 4,486,163 A * | 12/1984 | Pfeilstetter | 425/133.1 |
| 4,488,464 A | 12/1984 | Rooke et al. | |
| 4,500,271 A | 2/1985 | Smith | |
| 4,504,511 A * | 3/1985 | Binley | 426/565 |
| 4,514,165 A | 4/1985 | Bussey, Jr. | |
| 4,527,382 A | 7/1985 | Aono | |
| 4,534,724 A | 8/1985 | Fischer et al. | |
| 4,536,146 A | 8/1985 | Hernandez et al. | |
| 4,543,769 A | 10/1985 | Schmitz | |
| 4,574,673 A | 3/1986 | Pearl | |
| 4,581,970 A | 4/1986 | Hanson | |
| 4,589,833 A * | 5/1986 | Hayashi | 425/306 |
| 4,597,979 A | 7/1986 | Goglanian | |
| 4,636,158 A * | 1/1987 | Huang | 425/133.1 |
| 4,648,828 A | 3/1987 | Abe et al. | |
| 4,653,590 A | 3/1987 | Shank | |
| 4,698,228 A | 10/1987 | Straka et al. | |
| 4,752,205 A * | 6/1988 | Moriyama et al. | 425/465 |
| 4,756,916 A | 7/1988 | Dreher et al. | |
| 4,778,365 A | 10/1988 | Archer | |
| 4,802,838 A | 2/1989 | Schaaf | |
| 4,822,546 A | 4/1989 | Lohkamp | |
| 4,847,090 A | 7/1989 | Della Posta et al. | |
| 4,850,845 A | 7/1989 | Hicks | |
| 4,882,172 A | 11/1989 | Van Alstine | |
| 4,886,441 A | 12/1989 | Lortz | |
| 4,900,572 A | 2/1990 | Repholz et al. | |
| 4,936,203 A * | 6/1990 | Aoki et al. | 99/450.1 |
| 4,966,542 A | 10/1990 | Kobayashi | |
| 4,988,276 A | 1/1991 | Moeller | |
| 4,999,206 A | 3/1991 | Lortz | |
| 5,031,520 A * | 7/1991 | Tsay | 99/353 |
| 5,035,165 A | 7/1991 | Madsen | |
| 5,071,668 A | 12/1991 | Van Lengerich et al. | |
| 5,077,074 A | 12/1991 | Van Lengerich et al. | |
| 5,124,161 A | 6/1992 | Van Lengerich et al. | |
| 5,211,965 A * | 5/1993 | Kitagawa | 425/141 |
| 5,304,055 A | 4/1994 | Van Lengerich et al. | |
| 5,435,714 A | 7/1995 | Van Lengerich et al. | |
| 5,492,706 A * | 2/1996 | Cockings et al. | 426/282 |
| 5,510,135 A * | 4/1996 | Galder | 426/512 |
| 5,516,272 A * | 5/1996 | Cummins | 425/145 |
| 5,641,529 A | 6/1997 | Kunas | |
| 5,776,534 A * | 7/1998 | Christensen et al. | 426/516 |
| 5,888,558 A | 3/1999 | Janot et al. | |

(56) References Cited

U.S. PATENT DOCUMENTS

| | | | |
|---|---|---|---|
| 5,919,509 A * | 7/1999 | Cremers et al. | 426/516 |
| 6,103,151 A * | 8/2000 | Franke et al. | 264/40.7 |
| 6,257,863 B1 * | 7/2001 | Otte | 425/381 |
| 6,261,081 B1 * | 7/2001 | Speck et al. | 425/382.4 |
| 6,296,465 B1 * | 10/2001 | Deutsch et al. | 425/133.1 |
| 6,379,733 B2 * | 4/2002 | Matthews et al. | 426/516 |
| 6,626,660 B1 * | 9/2003 | Olson et al. | 425/190 |
| 6,712,595 B2 * | 3/2004 | Horna et al. | 425/133.1 |
| 6,797,213 B2 | 9/2004 | Bortone et al. | |
| 6,830,444 B2 * | 12/2004 | Franke et al. | 425/145 |
| 6,881,050 B1 * | 4/2005 | McIsaac et al. | 425/150 |
| 6,892,630 B1 * | 5/2005 | Huang | 99/450.1 |
| 7,007,559 B2 * | 3/2006 | Klammer et al. | 73/862.08 |
| 7,264,461 B2 * | 9/2007 | Ouellette | 425/381 |
| 7,293,974 B2 * | 11/2007 | Bortone et al. | 425/297 |
| 7,648,352 B2 * | 1/2010 | Morales-Alvarez et al. | 425/131.1 |
| 7,654,812 B1 * | 2/2010 | Kearns et al. | 425/205 |
| 7,654,813 B1 * | 2/2010 | Kearns et al. | 425/208 |
| 7,785,094 B1 * | 8/2010 | Kearns et al. | 425/204 |
| 2003/0049348 A1 * | 3/2003 | Bortone | 425/319 |
| 2003/0152681 A1 * | 8/2003 | Bortone | 426/516 |
| 2003/0206990 A1 * | 11/2003 | Edmondson et al. | 425/466 |
| 2004/0070103 A1 * | 4/2004 | Bortone et al. | 264/143 |
| 2004/0080066 A1 * | 4/2004 | Klammer et al. | 264/40.1 |
| 2004/0089968 A1 * | 5/2004 | Bortone | 264/167 |
| 2005/0019467 A1 * | 1/2005 | Bortone et al. | 426/516 |
| 2006/0121142 A1 * | 6/2006 | Pinchot | 425/208 |
| 2007/0087070 A1 * | 4/2007 | Ouellette | 425/313 |
| 2010/0074981 A1 * | 3/2010 | Morales-Alvarez et al. | 425/382.4 |
| 2012/0040078 A1 * | 2/2012 | Narwankar et al. | 426/618 |

FOREIGN PATENT DOCUMENTS

| | | |
|---|---|---|
| DE | 2301774 | 7/1974 |
| DE | 2616814 | 10/1977 |
| DE | 3131983 | 2/1983 |
| EP | 0218992 | 4/1987 |
| EP | 0218993 | 4/1987 |
| EP | 0275878 | 7/1988 |
| GB | 21136666 A | 9/1984 |
| GB | 2172541 A | 9/1986 |
| JP | 61274673 | 12/1986 |
| JP | 61280260 | 12/1986 |
| JP | 61280260 A | 12/1986 |
| JP | 61298373 | 9/1987 |
| WO | 8606327 A1 | 11/1986 |

* cited by examiner

APPARATUS AND METHOD FOR CURLED EXTRUDATE

CROSS-REFERENCE TO RELATED APPLICATIONS

The present application is a divisional of U.S. application Ser. No. 11/834,362, now U.S. Pat. No. 7,883,735, for an APPARATUS AND METHOD FOR CURLED EXTRUDATE, filed Aug. 6, 2007, which claims the benefit of U.S. Provisional Patent Application Ser. No. 60/821,628 for an APPARATUS AND METHOD FOR CURLED EXTRUDATE, filed on Aug. 7, 2006, which is hereby incorporated by reference in its entirety.

BACKGROUND OF THE INVENTION

1. Field of the Invention

The invention relates to extruded products and more particularly to processing a stream of product from an extruder to achieve a desired shape.

2. Description of the Related Art

Extruders are used in the preparation of various products, including food products such as ready-to-eat ("R-T-E") cereals. Extruders such as cooker extruders can be desirable because a single machine can produce large quantities of a cooked dough in a short period of time. Such cooker extruders can be used to prepare cooked dough extrudates which can thereafter be formed into individual cereal or snack pieces. The formation of such pieces may involve puffing the pieces to form finished puffed R-T-E cereals. In another variation, the capabilities of the extruder and the characteristics of the cooked cereal dough are such that the dough puffs immediately upon being extruded and is cut into individual puffed pieces at the die head.

SUMMARY OF THE INVENTION

In summary, the invention is an apparatus and method for producing a substantially spiral shaped food product. The apparatus includes a die defining a plurality of apertures disposed in a circle about a center. The apparatus also includes at least one cutting blade disposed for rotation about the center and operable to intermittently pass fully across each of the apertures during rotation. The apparatus also includes a plurality of slicing blades arranged for individual rotation about one of the plurality of apertures. The plurality of slicing blades are also arranged for continuous extension less than fully across the one aperture. The apparatus also includes a planetary coupling arrangement operably disposed to facilitate reciprocating rotation between the at least one cutting blade and the plurality of slicing blades.

BRIEF DESCRIPTION OF THE DRAWINGS

Applications of the present invention will become apparent to those skilled in the art when the following description of an exemplary embodiment for practicing the invention is read in conjunction with the accompanying drawings.

DETAILED DESCRIPTION OF AN EXEMPLARY EMBODIMENT

Figure 1:
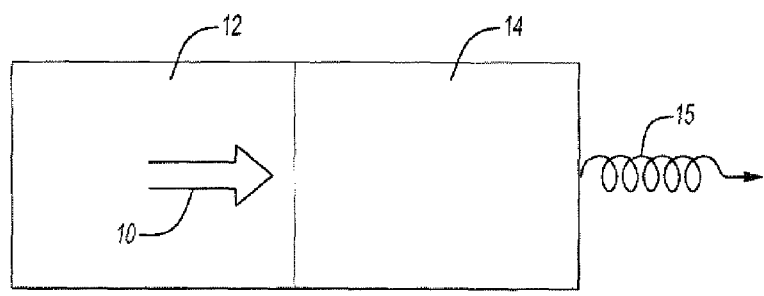
FIG. 1 is a schematic view of an exemplary operating embodiment of the invention.

Referring now to FIG. 1, in an exemplary embodiment of the invention, a food mass 10 is moved through an extruder 12 to a shaping assembly 14 and turned into a helically-shaped food product 15. The food mass 10 is worked by one or more screws in the extruder 12. The food mass 10 is subject to relatively high pressure such that water within the food mass 10 is superheated. The food mass 10 can be formulated such that the resulting discrete food product 15 is a snack piece or a cereal piece or any other kind of edible item.

Figure 2:
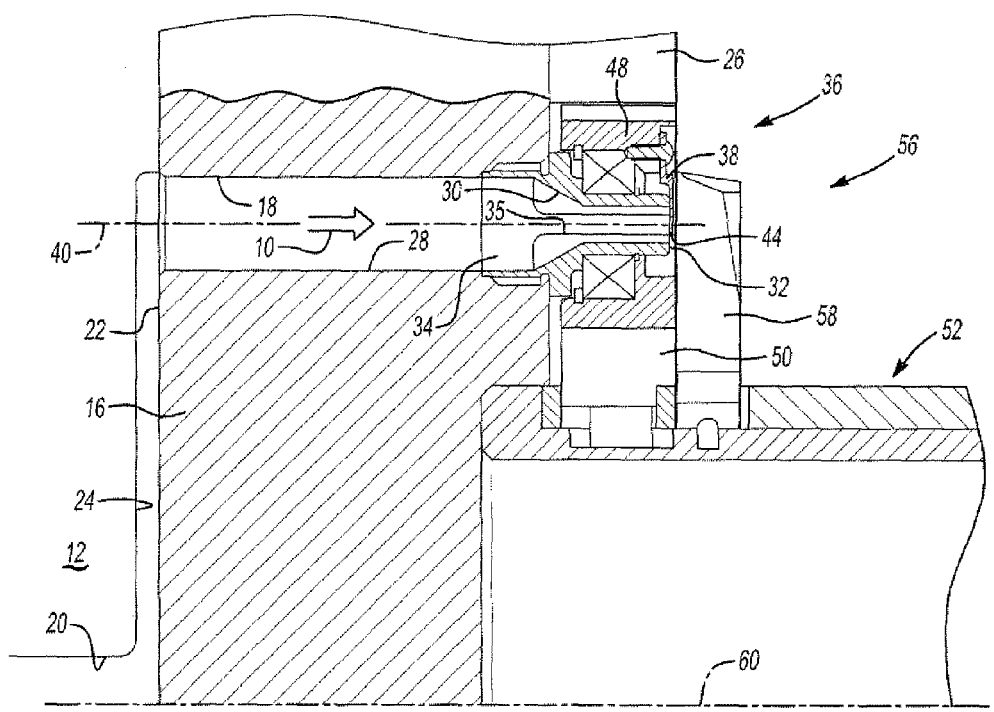
FIG. 2 is a cross-sectional view of a shaping assembly having a shaping tool according to the exemplary embodiment of the invention.

Referring now to FIG. 2, in the exemplary embodiment of a shaping tool, the shaping assembly 14 includes a channeling die plate 16 cooperating with the extruder 12 and forming one or more exit ports 18. An outlet 20 of the extruder 12 opens to a surface 22 of the channeling die plate 16. The food mass 10, still at high pressure, flows along the surface 22 to the one or more exit ports 18. The food mass 10 moves through a channel 24 between the outlet 20 of the extruder 12 and the exit port 18. The channel 24 can be defined by the flat surface 22 and a groove formed in the extruder 12, or by a flat surface of the extruder 12 and a groove in the surface 22, or by an additional plate disposed between the extruder 12 and the channeling die plate 16.

In the exemplary embodiment of the invention, the shaping assembly 14 includes a shaping tool supporting plate 26 adjacent to the channeling die plate 16. The plates 16, 26 define apertures 28, 30 aligned and in communication with one another to define the exit port 18. The aperture 30 of the plate 26 narrows with the respect to the aperture 28 prior to an exit 32 of the exit port 18 to increase the pressure of the food mass 10.

In an alternative embodiment of the invention, one or more coloring materials can be added to the food mass 10 prior to the exit 32 to modify the visual appearance of the finished food product 15. Also, one or more substreams of the food mass 10 can be combined to modify the taste, appearance and/or texture of the finished food product 15. In the exemplary embodiment of the invention, an insert 34 is disposed in the exit port 18 to accommodate the addition of two different colors, a first color on the outside of the food product immediately emerging from the exit 32 and a second color on the inside of the food product immediately emerging from the exit 32. The insert 34 includes a shaft portion 35 that is centered and extends along an axis 40 of the exit port 18.

The food mass 10 exits high pressure conditions at the exit 32. The shaping assembly 14 is disposed adjacent the exit 32 and includes a shaping tool 36 at the exit 32 to induce a spiral or helix shape in the food mass 10 exiting the exit 32. The shaping tool 36 of the exemplary embodiment of the invention includes a blade 38 extending at least partially across the exit 32. The shaping tool 36 rotates about a center axis 40 of the exit 32 as the food mass 10 passes out of the exit 32.

Figure 3:
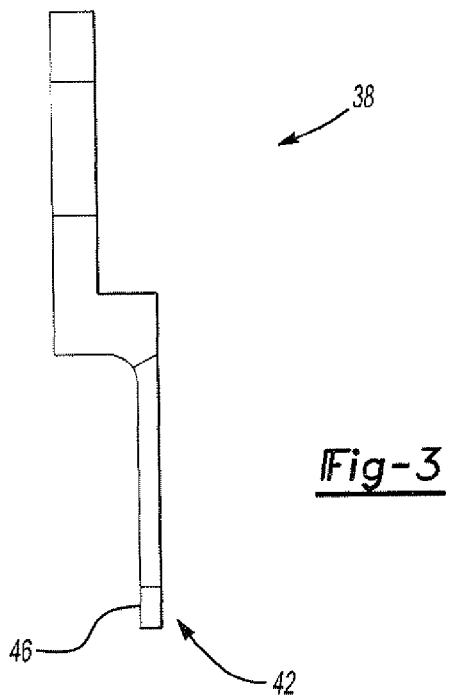
FIG. 3 is left-hand view of a blade of the shaping tool according the exemplary embodiment of the invention.
Figure 4:
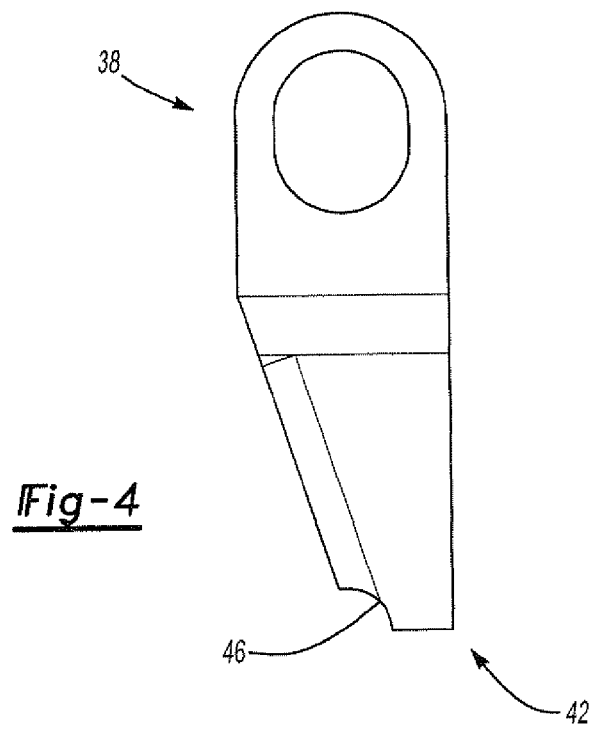
FIG. 4 is a front view of the blade shown in FIG. 3.

In the exemplary embodiment of the invention, the blade 38 extends half-way across the exit 32. A free end or cantilevered end 42 of the blade 38 (shown in FIGS. 3 and 4) is disposed in a groove 44 of the shaft portion 35 to reduce the likelihood of deflection of the blade 38. The groove 44 is annular and extends around the axis 40. The exemplary blade 38 includes a notch 46 shaped to correspond to the shape of the bottom of the groove 44. In one possible alternative embodiment of the invention, a blade could extend fully across the exit 32 in place of the blade 38 that extends partially across the exit 32.

Figure 5:
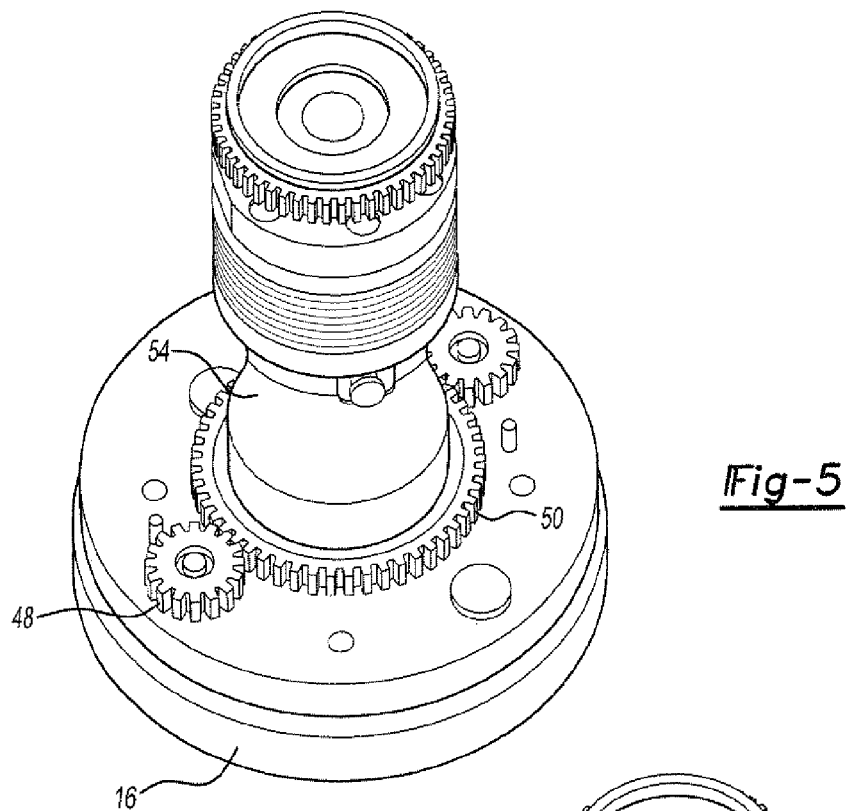
FIG. 5 is a first perspective view of the exemplary shaping assembly wherein a shaping tool supporting plate has been removed.
Figure 6:
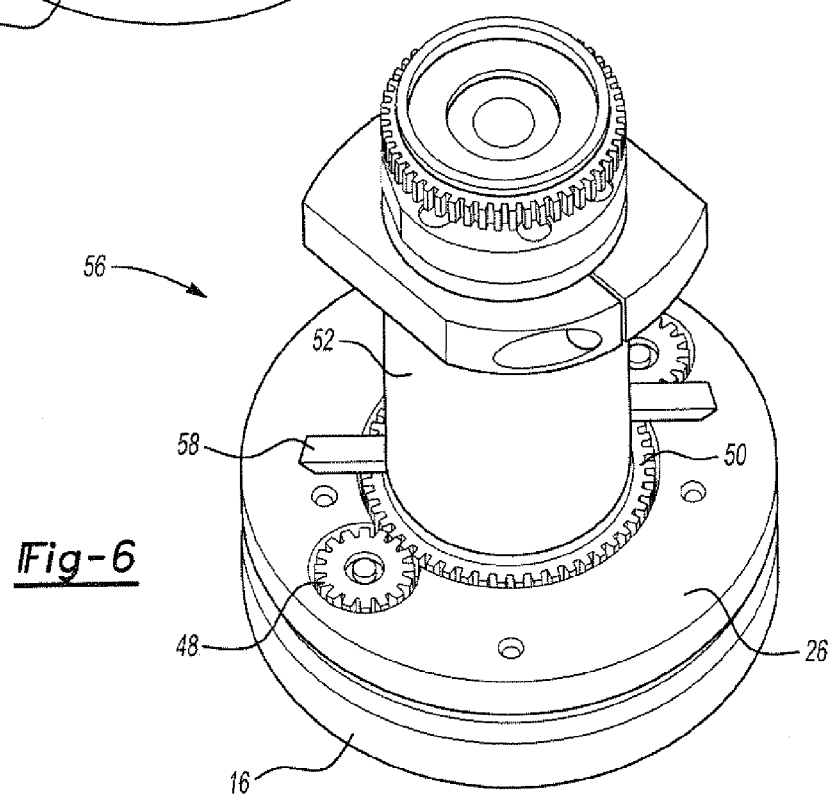
FIG. 6 is a second perspective view of the exemplary shaping assembly with the shaping tool supporting plate.

The shaping tool 36 is fixed to a satellite gear 48. The shaping tool 36 is releasably fixed to the gear 48 such that the shaping tool 36 can be replaced as required. The exemplary shaping tool 36 is rotated about the axis 40 by the cooperation between the satellite gear 48, a primary or sun gear 50, a spindle 52, and a motor 54 (shown in FIG. 5). The motor 54 rotates the spindle 52. The spindle 52 and the primary gear 50 are fixed together for concurrent rotation with one another about an axis 60. The primary gear 50 and the satellite gear 48 are engaged for reciprocating rotation with respect to one another.

The plates 16 and 26 include a plurality of exit ports similar to exit port 18; the exit ports being arrayed around the axis 20.

The arrangement and operation of the shaping tool 36 results in the food mass 10 being curled, spiraled, and/or helical shaped downstream of the shaping tool 36. The speed of rotation of the shaping tool 36 about the axis 40 can be varied to vary the extent or degree of curling. In another words, the relative tightness of the helix can be varied by varying the speed of rotation of the shaping tool 36. Also, the speed at which the food mass 10 exits the exit 32 can be varied in combination with varying the speed of rotation of the shaping tool 36 to vary the degree of curling.

The shaping assembly 14 of the exemplary embodiment of the invention includes a cutter 56 to separate the stream of the food mass 10 into discrete food pieces 15. The cutter 56 can include one or more blades 58 rotating about the axis 60. The axis 60 the exemplary embodiment of the invention is the center axis of the extruder 12 and is spaced from and parallel to the axis 40. The cutter 56 is fixed with respect to the gear 50 and the spindle 52 for concurrent rotation. The speed of rotation of the cutter 56 about the axis 60 can be varied relative to the speed of rotation of the shaping tool 36 by modifying the gear teeth, or gear ratio, of the gears 48 and 50.

Thus, a planetary coupling arrangement is defined between the gears 48, 50 to facilitate reciprocating rotation between the cutting blade 58 and the shaping blade 38. Embodiments of the invention can include a plurality of shaping blades 38 and a plurality of cutting blades 58. The planetary coupling arrangement allows for a compact arrangement for a plurality of food streams exiting a plurality of exit ports.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What can be claimed is:

1. A shaping assembly for producing a discrete spiral shaped food product comprising:
   a die defining at least one aperture centered on an aperture axis and extending to an aperture exit for movement of a stream of food mass through said at least one aperture and out said aperture exit;
   at least one shaping tool having a shaping blade disposed across at least a portion of said at least one aperture, wherein said shaping blade rotates about said aperture axis and is configured to shape the stream of food mass into a spiral shaped stream of food mass;
   a cutter having at least one cutting blade about a cutter axis being spaced from said aperture axis, wherein said at least one cutting blade rotates and intermittently passes across said at least one aperture during rotation for separating the spiral shaped stream of food mass into the discrete spiral shaped food product; and
   a coupling arrangement engaging both said at least one shaping tool having said shaping blade and said cutter having said at least one cutting blade to concurrently rotate both of said at least one cutting blade on said cutter and said shaping blade on said at least one shaping tool to create the discrete spiral shaped food product.

2. The shaping assembly as set forth in claim 1 further including an insert disposed in said aperture and having a shaft portion extending along said aperture axis to a distal end disposed outward of said aperture exit of said at least one aperture.

3. The shaping assembly as set forth in claim 2 wherein said shaping blade includes an end and said shaft portion includes an annular groove disposed at said distal end and outward of said at least one aperture for receiving said end of said shaping blade.

4. The shaping assembly as set forth in claim 3 wherein said end of said shaping blade is curved to correspond to said annular groove of said shaft portion.

5. The shaping assembly as set forth in claim 3 wherein said end of said shaping blade includes a notch defined therein to correspond to said annular groove for engaging said annular groove.

6. The shaping assembly as set forth in claim 1 wherein said die defines a plurality of apertures arrayed about said cutter axis, each of said apertures being centered on an aperture axis.

7. The shaping assembly as set forth in claim 1 wherein said at least one aperture has a cross-sectional area and said cross-sectional area narrows as said at least one aperture approaches said aperture exit for increasing a pressure on the stream of food mass.

8. The shaping assembly as set forth in claim 1 wherein said cutter includes a plurality of cutting blades arrayed about said cutter axis and equally spaced for separating the spiral shaped stream of food mass into the discrete spiral shaped food product.

9. The shaping assembly as set forth in claim 1 wherein said coupling arrangement includes a spindle centered on said cutter axis.

10. The shaping assembly as set forth in claim 9 wherein said at least one cutting blade is fixed to said spindle for rotation with said spindle.

11. The shaping assembly as set forth in claim 9 further including a motor for rotating said spindle.

12. The shaping assembly as set forth in claim 9 further including a primary gear centered on said cutter axis and fixed to said spindle for rotation with said spindle.

13. The shaping assembly as set forth in claim 12 further including a satellite gear centered on said aperture axis and engaging said primary gear for rotation with respect to said primary gear.

14. The shaping assembly as set forth in claim 13 wherein said shaping tool is fixed to said satellite gear for rotation therewith.

15. The shaping assembly as set forth in claim 1 wherein said shaping assembly is secured to an extruder for receiving an extruded stream of food mass.

16. A shaping assembly for producing a discrete spiral shaped food product comprising:
   a die defining at least one aperture centered on an aperture axis and extending to an aperture exit for movement of a stream of food mass through said at least one aperture and out said aperture exit;

at least one shaping tool having a shaping blade disposed across at least a portion of said at least one aperture, wherein said shaping blade rotates about said aperture axis and is configured to shape the stream of food mass into a spiral shaped stream of food mass;

a cutter having at least one cutting blade about a cutter axis being spaced from said aperture axis, wherein said at least one cutting blade rotates and intermittently passes across said at least one aperture during rotation for separating the spiral shaped stream of food mass into the discrete spiral shaped food product; and a coupling arrangement engaging both said at least one shaping tool having said shaping blade and said cutter having said at least one cutting blade to concurrently rotate both of said at least one cutting blade on said cutter and said shaping blade on said at least one shaping tool to create the discrete spiral shaped food product, wherein said coupling arrangement comprises a planetary coupling arrangement to reciprocally rotate said at least one cutting blade and said shaping blade.

* * * * *